(12) United States Patent  
Singh et al.

(10) Patent No.: US 7,757,124 B1  
(45) Date of Patent: Jul. 13, 2010

(54) METHOD AND SYSTEM FOR AUTOMATIC CORRELATION OF ASYNCHRONOUS ERRORS AND STIMULI

(75) Inventors: Amandeep Singh, Fremont, CA (US); Debashish Bose, Fremont, CA (US)

(73) Assignee: Oracle America, Inc., Menlo Park, CA (US)

( * ) Notice: Subject to any disclaimer, the term of this patent is extended or adjusted under 35 U.S.C. 154(b) by 422 days.

(21) Appl. No.: 11/879,304

(22) Filed: Jul. 16, 2007

(51) Int. Cl.  
*G06F 11/00* (2006.01)

(52) U.S. Cl. .......................................... 714/32; 714/45

(58) Field of Classification Search .................. 714/32, 714/45  
See application file for complete search history.

(56) References Cited

U.S. PATENT DOCUMENTS

| | | | |
|---|---|---|---|
| 6,560,720 B1 * | 5/2003 | Chirashnya et al. ............ | 714/32 |
| 7,020,802 B2 * | 3/2006 | Gross et al. .................... | 714/39 |
| 7,171,589 B1 * | 1/2007 | Urmanov et al. ............... | 714/47 |
| 7,444,551 B1 * | 10/2008 | Johnson et al. ................ | 714/43 |
| 2005/0268170 A1 * | 12/2005 | Kearney et al. ................ | 714/32 |
| 2006/0143540 A1 * | 6/2006 | Burk ............................. | 714/41 |

OTHER PUBLICATIONS

Fraser et al., "Hardening COTS Software with Generic Software Wrappers", *Proceedings of the 1999 IEEE Symposium on Security and Privacy*, 1999, IEEE, pp. 1-15.

Gross, "Continuous System Telemetry Harness: Achieving True Autonomic Computing, Self Healing Qualities and Proactive Fault Avoidance Through Telemetry", 2004, Sun Labs Open House, pp. 1-28.

"Predictive Self-Healing in the Solaris™ 10 Operating System: A Technical Introduction", Jun. 2004, Sun Microsystems, Inc., pp. 1-6. No author provided.

* cited by examiner

*Primary Examiner*—Michael C Maskulinski  
(74) *Attorney, Agent, or Firm*—Gunnison, McKay & Hodgson, L.L.P.; Forrest Gunnison

(57) ABSTRACT

A test and system state recorder (TSSR) controller of a test and system state recorder automatically correlates and captures information about possible stimuli from telemetry information events generated by a test or tests of a test system. The TSSR controller simultaneously and automatically correlates and captures information about other possible stimuli, such as environmental stimuli from telemetry information events generated by optional telemetry event generators. TSSR controller keeps a snap-shot list of the most current stimuli from each sender of telemetry information events. On receipt of an asynchronous trigger event generated by a fault management controller the snap-shot list is logged in a test and system state recorder log. The entry in the log provides automatic correlation of asynchronous errors and stimuli.

18 Claims, 14 Drawing Sheets

```
/*
 * Copyright 2006 Sun Microsystems, Inc.  All rights reserved.
 */
#pragma ident   "@(#)tssr.h     1.13        06/11/15 SMI"

#ifndef _TSSR_H
define _TSSR_H include <libnvpair.h>
include <sys/types.h> ifdef  __cplusplus
extern "C" {
#endif
/*
 * This file declares interfaces common between the TSSR agent,
 * TSSR Library and the VS FMD module. This file needs to be
 * included by any telemetry or trigger provider.
 */

/* INTERFACES FOR TELEMETRY PROVIDERS */ define TEST_CMD
            "Test Option(s)"
#define SUBTEST_NAME            "Subtest"
#define DATA_PATTERN            "Data Pattern"
#define LOOP_COUNT              "Loop Count"
#define PASS_COUNT              "Pass Count"

/*
 * #define SESSION_NAME                         "Session Name"
 *
 * For TSSR Phase-1 "Session Name" will be provided by the
 * client program (vtsk / supervisory script) as the first
 * argument of the tssr_telemetry_event() API. Any meaning ful
 * string may be used, For example in case of VTSK, VTS test
 * mode (Functional, Exclusive etc.) may be used as session
 * names.
 */ define TSSR_VERSION            1 define TSSR_NAME_LEN           64 define TSSR_DOOR_FILE          "/var/run/tssr_door"
```

FIG. 4A

```
/*
 * TSSR Telemetry Event Types
 */ typedef enum {

TSSR_TELEMETRY_INFO,
    TSSR_TELEMETRY_DONE,
    TSSR_SESSION_START,
    TSSR_SESSION_STOP

} tssr_event_type_t;

/*
 * Internal structure to interface between APIs of libtssr
 * and TSSR-agent, to pass telemetry
 */ typedef struct { int                 version;
    tssr_event_type_t   event_type;
    char                unique_name[TSSR_NAME_LEN];
    uint32_t            nvl_size;
    int32_t             padding; /*So packed_nvl is at 8 Byte
                                            boundry*/
    char                packed_nvl[1];

} tssr_event_t;

extern int tssr_telemetry_event(
                        const char* testname,
                        int which_instance,
                        const char* devname,
                        tssr_event_type_t event_type,
                        nvlist_t* nvl );

extern const char* tssr_get_error_string(int tssr_error_code);
```

FIG. 4B

```
/* INTERFACES FOR TRIGGER PROVIDERS */ define vts_fmd_mod_vendor
            "SUNW"
#define vts_fmd_mod_publisher              "vts.fmd.mod"
#define vts_fmd_mod_class                  "vts.tssr.trigger"

/*
 * Event subclass would be trigger generator specified
 * information that will allow TSSR agent to print something
 * meaningful if an event is dropped by the TSSR agent, as a
 * result of queue overflow etc. in an error/trigger storm.
 */

/* VTS FMD Module defines */ define VTS_FMD_MOD_DESC        "SUNWvts FMD Module"
define VTS_FMD_MOD_VERSION     "1.0"

/*** TSSR AGENT EXIT CODES - Interface between TSSR agnet
 *and VTSK***
 */ define TSSR_NOEXIT                        0 define TSSR_SUCCESS                       0
define TSSR_RWLock_ASSERT                 1
#define TSSR_LOG_EXCEPTION                 2
#define TSSR_EXCEPTION                     3
#define TSSR_BAD_ALLOC                     4
#define TSSR_UNKNOWN_EXCEPTION             5
#define TSSR_ERR_ASYNC_SIG                 6
/*     "TSSR Agent Stopped Due to Asynchronous Signal."*/
#define TSSR_ERR_LOG_INIT                  7
/*     "TSSR Agent Failed to Initialize Logging Module."*/ define    TSSR_ERR_INIT                   8
/*     "TSSR Agent Failed to Initialize."*/ define    TSSR_ERR_USAGE                  9
/*     "TSSR Agent Failed to Start Due to Invalid Arguments."*/ ifdef   __cplusplus
}
endif endif   /* _TSSR_H */
```

FIG. 4C

METHOD AND SYSTEM FOR AUTOMATIC CORRELATION OF ASYNCHRONOUS ERRORS AND STIMULI

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates generally to root cause and corrective action, and more particularly to automated systems to facilitate root cause and corrective action.

2. Description of Related Art

With advances in technology, computer system product life cycles are getting shorter whereas the systems themselves are becoming more and more complex. At the same time, there is ever increasing pressure to reduce the time and cost involved in isolating and fixing any faults that are detected during the productive life of the system.

A defect/fault refers to deviation of the functioning of a component from desired behavior. Stimulation of a fault results in a failure and manifestation of a failure is called an error. In other words, an error is a symptom of a fault and is seen on the occurrence of a failure. As such a fault can exist in a system and stay undetected (absence of errors) until a particular kind of stimuli is applied that causes the failure.

Correlating errors to a fault is called diagnosis. Analyzing the cause of a defect/fault is called root cause analysis (RCA), an important first step in taking corrective action for improving product quality. Often times identifying the factors (stimuli) that impact the time to failure can lead to the timely root cause and corrective action (RCCA).

The need for timely root cause and corrective action is well understood. Those who are tasked with conducting root cause and corrective action also know how important it can be to reproduce a failure to identify the stimuli of interest. At the same time, it can be difficult to reproduce certain transient faults that may have been stimulated by a specific (yet unknown) set of stimuli. Such stimuli can consist of specific test algorithms, data-patterns, addressing sequences, environmental conditions etc., or a combination thereof.

To make matters complicated, most of the hardware errors in today's systems are reported asynchronously. This is true for correctable and non-fatal errors, both of which may be indications of an incipient fault. For example, in case of ECC (Error Correction Code) protected memory, every time the processor reads a memory location, the processor checks for the correctness of the data against the ECC code previously stored during the write operation. On detecting a single bit upset, the processor may transparently provide the corrected data to the application (possible stimulus) that requested the data. While the processor may also generate a trap to report the error event, by default this is totally transparent to the application. As such, the application that stimulated the failure is not even aware of the error.

One can see how such mechanisms are required and useful from normal user/customer application's point of view. At the same time, this means that special test applications, designed to stimulate errors have to deal with an extra hurdle to detect the occurrence of an error and log information about the activity that might have stimulated the fault. For failures, which are stimulated by a combination of different stimuli like temperature, voltage, signal noise etc., the process of error duplication and root cause analysis can be even more complicated.

Various tools have been developed for use in root cause and corrective action. Efforts to facilitate root cause and corrective action are not new. With the introduction of a Fault Management Architecture that provides Protective Self Healing in the Solaris 10 operating system, available from Sun Microsystems, Inc of Santa Clara, Calif., the operating system has taken on the onus of doing fault diagnosis and management.

With the Fault Management Architecture, a fault or defect in software or hardware can be associated with a set of possible observed symptoms, called errors. When an error is observed, an error report is generated. Error reports are encoded as a set of name-value pairs, described by an extensible protocol, forming an error event.

Error events and other data that can be gathered to facilitate automated repair of the fault are dispatched to diagnosis engines designed to diagnose the underlying problems corresponding to these symptoms. Diagnosis engines run in the background silently consuming telemetry until a diagnosis can be completed or a fault can be predicted. After processing sufficient telemetry to reach a conclusion, a diagnosis engine produces another event, called a fault event, which is broadcast to any agents deployed on the system that know how to respond.

A software component known as a Fault Manager in the Fault Management Architecture, which is implemented as daemon, manages the diagnosis engines and agents; provides a simplified programming model for these clients as well as common facilities such as event logging; and manages the multiplexing of events between producers and consumers.

Thus, the Fault Management Architecture does the fault diagnosis based on the error reports (e-reports). The Fault Manager collects the e-report(s) and utilizes the diagnosis engines to identify the action needed to "isolate" the impact of the fault from the rest of the working system. This action is based on a set of pre-defined rules that may involve diagnosing the error to find the exact fault. The primary goal is to deduce an actionable conclusion.

Whether the exact fault is identified, the action in general consists of identifying an Automated System Recovery Unit (ASRU) that can be disabled to isolate the impacts of the fault. The Fault Management Architecture does not attempt to collect telemetry about the stimuli that may have instigated the fault.

The action that Fault Management Architecture takes is the right first response by correcting the problem and keeping the system running. However, the more time consuming root cause and corrective action phase comes later and is not dealt with by the Fault Management Architecture.

A Continuous System Telemetry Harness (CSTH) from Sun Microsystems, Inc. records system environmental data (typically available via "showevn" command—component temperature, voltage levels etc.) as continuous time series signals. In addition, under certain circumstances CSTH aims to analyze the data so archived and predict failures that may occur in the future.

For example, predictions maybe based on voltage or temperature fluctuations historically known to be indicative of an incipient fault. Such prediction is typically possible (and useful) in cases where the degradation may appear hours or sometimes days in advance of failure.

For crashes that occur with no predictive warning, the CSTH is still often valuable because the archived telemetry data may be mined to identify signatures from variables that showed anomalies just prior to crash, thereby helping to mitigate No-Trouble-Found (NTF) events. As CSTH keeps a circular file of the captured telemetry, the information in the file can also be used to validate the functionality of various sensors (that monitor voltage and temperature) of the system.

Although CSTH implements an excellent 'Black Box Flight Recorder' for computer systems, CSTH does not automatically correlate asynchronous error events with the stimuli. Root cause analysis requires post-processing of significant amounts of data and a manual correlation of the stimulus with the telemetry readings (say, based on time stamps). While the circular log of all telemetry information is useful in some situations (as explained above), such a file is not well-suited for correlating error occurrences with test stimuli because some the needed stimuli may have been overwritten.

Test suites, like SunVTS™ diagnostic tool, can have multiple test processes running concurrently on the system and different tests may start and complete asynchronously. Furthermore, such tests can generate massive amounts of messages (telemetry) about test progress, patterns and algorithm/ logic being executed. This can lead to huge logs in a short amount of time and obviously makes it difficult to manually correlate exactly which test processes were running at the time of error. Thus, while these various systems represent significant advances, root cause and corrective action still requires manually combing through extensive logs that may or may not contain the information about the stimuli that resulted in the error.

SUMMARY OF THE INVENTION

In one embodiment of this invention, a computer-based method includes receiving telemetry events from at least one telemetry event provider. Each telemetry event provider provides telemetry information about a stimulus applied to a system on which the computer-based method is executing.

The method maintains a snap-shot list of information from the telemetry events. The snap-shot list includes at most one entry from each telemetry provider that has sent a telemetry event.

The method also logs, upon receiving a trigger event associated with an error in the system, the snap-shot list as a log entry in a log file stored in a non-volatile memory. The trigger event indicates an error in the system. The log file stores a snap-shot of stimuli applied to the system at the time of the receipt of the trigger event.

In one embodiment, the telemetry event is a telemetry information event. The method further includes queuing the telemetry information event when a trigger event is being processed. The method also includes extracting information from the telemetry information event and using the information to form a unique identifier. In one embodiment, only when a read lock is not active, can a write lock be obtained for writing telemetry information in the telemetry information event to the snap-shot list.

In another embodiment, the telemetry event comprises a telemetry terminate event. In response to the telemetry terminate event, information is extracted from the telemetry terminate event. The information is used to form a unique identifier. Any entry in the snap-shot list including that unique identifier is deleted from the snap-shot list.

In yet another embodiment, a test and system recorder includes a log file stored in a non-volatile memory and a unit under test. The unit under test includes a test system including at least one test process executing on the unit. The test process generates telemetry events and at least one of the telemetry events includes telemetry information about a stimulus applied to the unit under test.

The unit under test also includes a fault management controller executing on the unit. The fault management controller receives an error report describing an error in the unit and generates a trigger event in response to the error report.

The unit under test further includes a test and system state recorder (TSSR) controller executing on the unit. The TSSR controller receives the telemetry events and the trigger events. The TSSR controller also maintains a snap-shot list of information from the telemetry events. The snap-shot list includes at most one entry from the at least one test process. The TSSR controller logs, upon receiving a trigger event, the snap-shot list as a log entry in the log file. Thus, the log file stores a snap-shot of stimuli applied to the unit under test at the time of receipt of the trigger event.

BRIEF DESCRIPTION OF THE DRAWINGS

FIGS. 4A to 4C are a computer program listing for application programming interfaces used to implement one embodiment of this invention.

In the drawings and following Detailed Description, elements with the same reference numeral are the same or equivalent elements. The first digit of a reference numeral is the figure number of the figure in which the element with that reference numeral first appeared.

DETAILED DESCRIPTION

Figure 1:
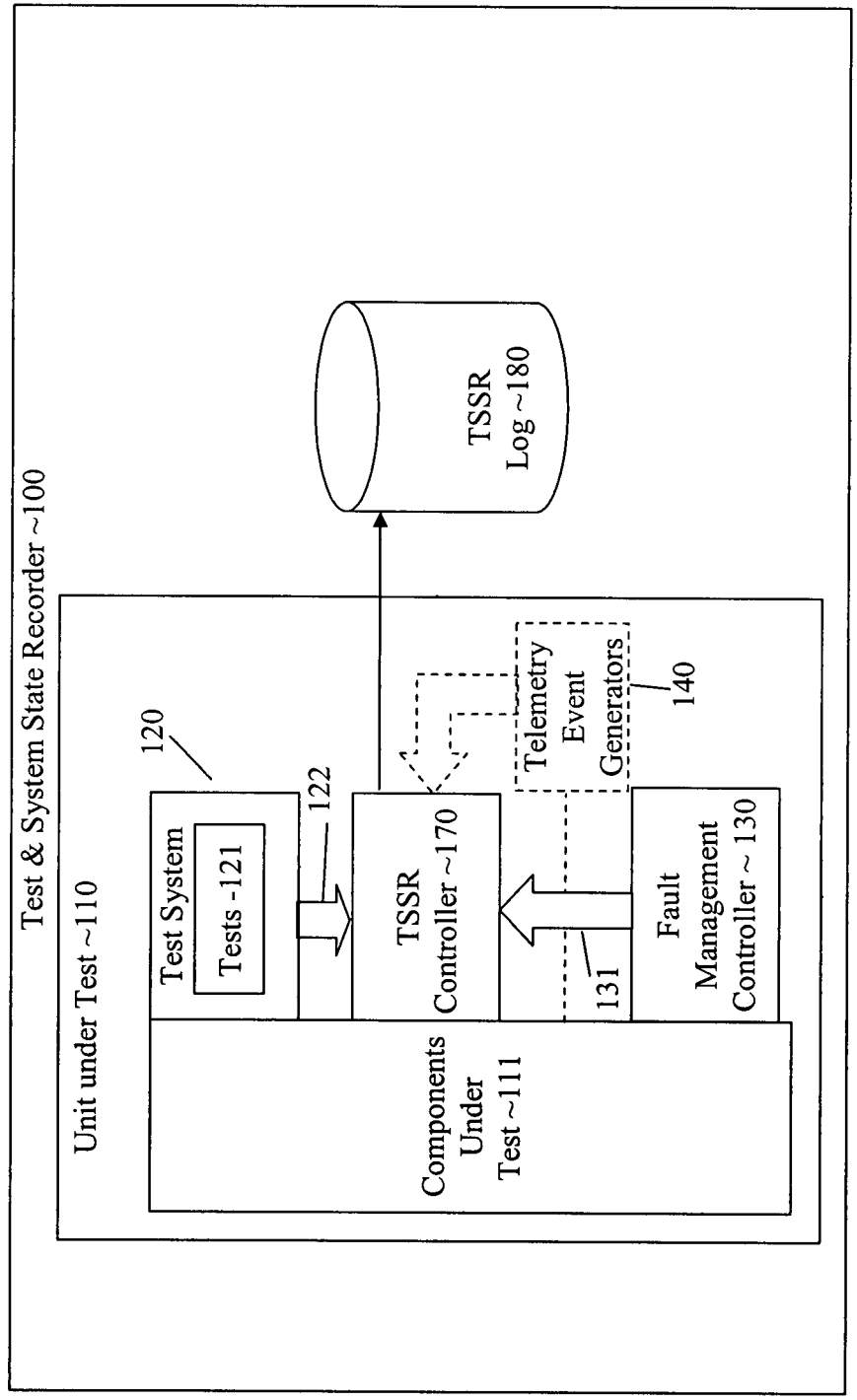
FIG. 1 is a block diagram of a test and system state recorder that includes (i) a unit under test that in turn includes components under test, a test system, a TSSR controller, a fault management controller and optionally telemetry event generators; and (ii) a TSSR log according to one embodiment of this invention.

In one embodiment of this invention, a test and system state recorder (TSSR) controller 170 of a test and system state recorder 100 automatically correlates and captures information about possible stimuli from telemetry information events 122 generated by a test or tests 121 of test system 120. TSSR controller 170 simultaneously and automatically correlates and captures information about other possible stimuli, such as environmental stimuli from telemetry information events generated by optional telemetry event generators 140.

TSSR controller 170 keeps a snap-shot list of the most current stimuli from each sender of telemetry information events. Typically, the snap-shot list is maintained in a volatile memory of TSSR controller 170, such as random access memory.

There is no limit on the number of senders providing telemetry information events to TSSR controller 170. To maintain only the latest snap-shot of the telemetry information, only one entry is allowed per sender in the snap-shot list. If a new telemetry event is received from the same sender, information obtained via the previous event from the same sender is overwritten automatically in the snap-shot list. Multiple telemetry information events from the same or multiple senders can be sent/received at the same time. TSSR controller 170 is responsible to maintain the coherency of the snap-shot list.

On receipt of an asynchronous trigger event 131 generated by fault management controller 130, the snap-shot list is logged in test and system state recorder log 180 in a non-volatile memory, for example, a disk of a hard disk drive. Thus, test and system state recorder 100 provides a snap-shot of the executing applications, i.e., tests 121, and other captured information, such as environmental conditions, system load, time, etc. at the time of the occurrence of trigger event 131. In one embodiment, the snap-shot list provides information like, a name of the test executing at the time of receipt of the trigger event, specific algorithm in use by the test (test logic or sub-test), data-pattern, addressing pattern, other test specific instrumentation, component temperature, overall system stress, name of different processes running on the system, state of system memory etc.

Trigger event 131, which causes the snap-shot list to be logged in TSSR log 180, can include any desired events, e.g., occurrence of a test failure, expiry of a timer, a signal/event generated by a software module that is exiting due to an exception etc., which are referred to herein as error events. Trigger event 131 is not limited to hardware errors alone in components under test 111. The telemetry from test system 120 and telemetry event generators 140 does not persist by default, logging action occurs only when a trigger event 131, i.e., an error event, is received.

Thus, in each instance, the stimuli at the time of receipt of a trigger event are recorded. Accordingly, doing root cause and corrective action no longer requires pouring over massive volumes of log data and attempting to deduce the stimuli. Rather, the snap-shot list provides the stimuli and thereby correlates the trigger event with specific stimuli automatically.

The log is not only useful for root cause and corrective action analysis, but also useful in other applications. For example, on a manufacturing floor where assembled computers are subjected to twenty-four hours of testing, it may be desirable to reduce the testing period to twenty hours. By examination of the logs from the twenty-four hour tests, and evaluating which tests are stimulating what kind of errors, the test process may be optimized by adjusting test sequences as well as by removing tests that are not effective.

As explained more completely below, test and system state recorder 100 provides a protocol and interfaces for different modules to generate "telemetry" events and "trigger" events that test and system state recorder controller 170 can listen to and take appropriate action on. Test and system state recorder controller 170 does not need any prior knowledge of the specific modules that generate the trigger and telemetry events. Such modules can therefore be added and removed at any time from unit under test 110, i.e., before or after deployment of test and system state recorder controller 170. This gives flexibility to add new telemetry modules on an as-needed basis, without disturbing test and system state recorder controller 170, even if additional stimuli of interest are identified late in a debug process.

Figure 2A:
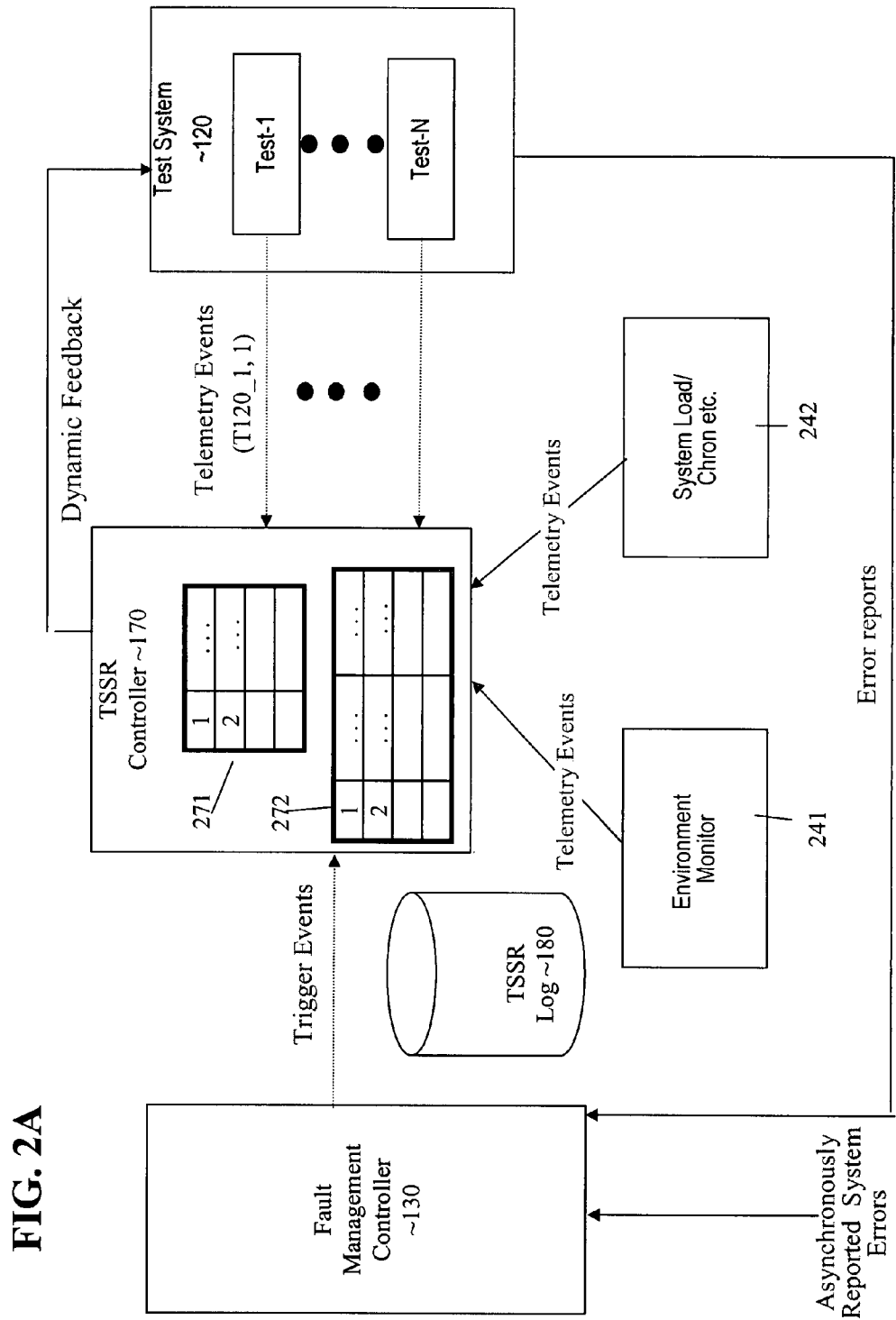
FIGS. 2A to 2H are a more detailed diagram of the test system, the TSSR controller, the fault management controller and the optional telemetry event generators demonstrating the processing of various events according to one embodiment of this invention.

FIG. 2A is a more detailed embodiment of one embodiment of elements in test and system state recorder 100. In this embodiment, test system 120 executes a plurality of test processes Test-1 to Test-N, sometimes referred to as tests Test-1 to Test-N. Here, N is an integer number. Each test process Test-i, where i ranges from 1 to N, sends telemetry events to TSSR controller 170 reporting stimuli that are applied to unit under test 110. Plurality of test processes Test-1 to Test-N run concurrently on test system 120 and different test processes may start and complete asynchronously.

In one embodiment, test system 120 is the SunVTS™ diagnostic tool. The Sun Microsystems, Inc. validation test suite software, i.e., SunVTS™ diagnostic tool, is a comprehensive software diagnostic package that tests and validates hardware by verifying the connectivity and functionality of most hardware components. SunVTS™ diagnostic tool is a system exerciser that checks for intermittent or long-term failures. SunVTS™ software executes multiple diagnostic tests from a GUI that provides test configuration and status monitoring. The SunVTS™ interface can run on one workstation to display a SunVTS™ test session of another workstation on the network. See SunVTS™ 6.2 User's Guide, Sun Microsystems, Inc., 4150 Network Circle, Santa Clara, Calif. 95054, U.S.A. 2006, which is incorporated herein by reference to demonstrate the level of skill in the art.

Herein, when it is stated that software, a computer program, a test process, an instruction, etc., performs an action or actions, those of skill in the art will understand that the action or actions are the result of executing one or more instructions on a processor, or, for example, the result of executing one or more instructions in combination with automated hardware.

Also, in one embodiment, fault management controller 130 is the Fault Manager daemon in the Fault Management Architecture (FMA) of the Solaris 10 operating system (Solaris OS). The Solaris OS uses the Fault Manager daemon, fmd (1M), which starts at boot time and runs in the background, to monitor the system. If a component generates an error, the daemon handles the error by correlating the error with data from previous errors and other related information to diagnose the problem. Each problem diagnosed by the Fault Manager daemon is assigned a Universal Unique Identifier (UUID). The UUID uniquely identifies this particular problem across any set of systems. When possible, the Fault Manager daemon initiates steps to self-heal the failed component and take the component offline. The Fault Manager daemon also logs the fault to the syslog daemon and provides a fault notification with a message ID (MSGID).

In the embodiment of FIG. 2A, telemetry event generators 140 (FIG. 1) are represented by environment monitor application 241 and system load/chron application 242. In one embodiment, environment monitor application 241 is the Continuous System Telemetry Harness discussed above and that description is incorporated herein by reference. Environment monitor application 241 sends telemetry events including environmental information, while system load/chron application 242 sends information on system stress etc.

In the following description of FIG. 2A only the telemetry events from test system 120 are considered. However, in view of this description, the processing of other telemetry events by TSSR controller 170 is apparent and equivalent to that described more completely below.

In one embodiment, TSSR controller 170 runs as a system daemon process and is purely event driven. During initialization of TSSR controller 170, controller 170 registers with fault management controller 130 for the trigger events of which controller 170 wants to be notified. For the Fault Manager daemon embodiment, the registration utilizes a module implemented as a dynamically load-able object that is loaded into the Fault Management daemon's address space. This object subscribes to error events and fault events. On receiving a fault management error report, the associated error event is a trigger event for TSSR controller 170. Fault manager controller 130 includes a fault management error report in the trigger event sent to TSSR controller 170. Similarly, a fault event is a trigger event and results in sending TSSR controller 170 the corresponding report, which can be used to provide feedback to the tests.

After registering with fault management controller 130, TSSR controller 170 processes (i) telemetry events from test system 120, and (ii) trigger events from fault management controller 130. In this embodiment, each telemetry information event includes at least (a) information to uniquely identify the sender of the event, and (b) telemetry information about the stimulus or stimuli applied by the event provide to unit under test 110 (like test and sub-test name currently being executed or current temperature etc.). The telemetry information event optionally can include additional information, e.g., a header, like the time when the event was generated, operating system process ID (PID) of the process that generated the event etc. For example, test process Test-1 sends a telemetry information event (T120_1, 1) (FIG. 2A) where the unique identifier is T120_1 and 1 is the telemetry information that identifies a stimulus.

Figure 2B:
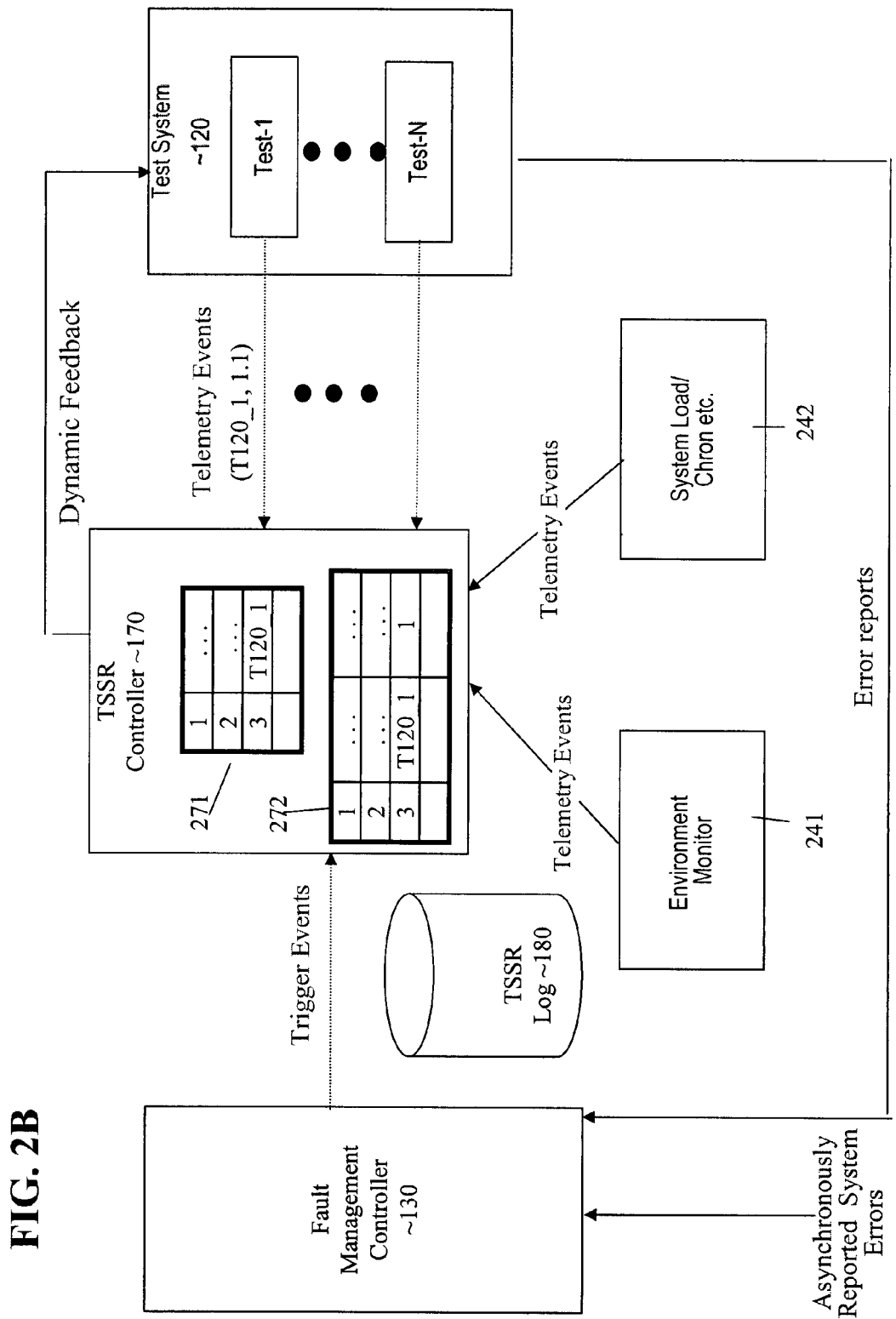

Upon receipt of telemetry information event (T120_1, 1), TSSR controller 170 extracts unique identifier T120_1 for the sender and telemetry information 1 from the event. Next, TSSR controller 170 determines whether the sender associated with unique identifier T120_1 has previously sent an event, e.g., the second column of index table 271 is searched for unique identifier T120_1. Since this is the first event from the sender, unique identifier T120_1 is not found. Thus, TSSR controller 170 assigns an index 3, in this example, to the sender (See FIG. 2B). Next, TSSR controller 170 accesses the location in current telemetry event list 272, sometimes called snap-shot list 272, associated with the index and writes a name-value pair, the unique identifier and the telemetry information, in list 272. This concludes the processing of event (T120_1, 1).

The use of table 271 and list 272 are illustrative only of structures in a memory of TSSR controller 170 that are used to store information and are not intended to limit the invention to this specific embodiment. In view of this disclosure, the information in these structures can be stored in a manner appropriate for a particular implementation of TSSR controller 170.

Figure 2C:
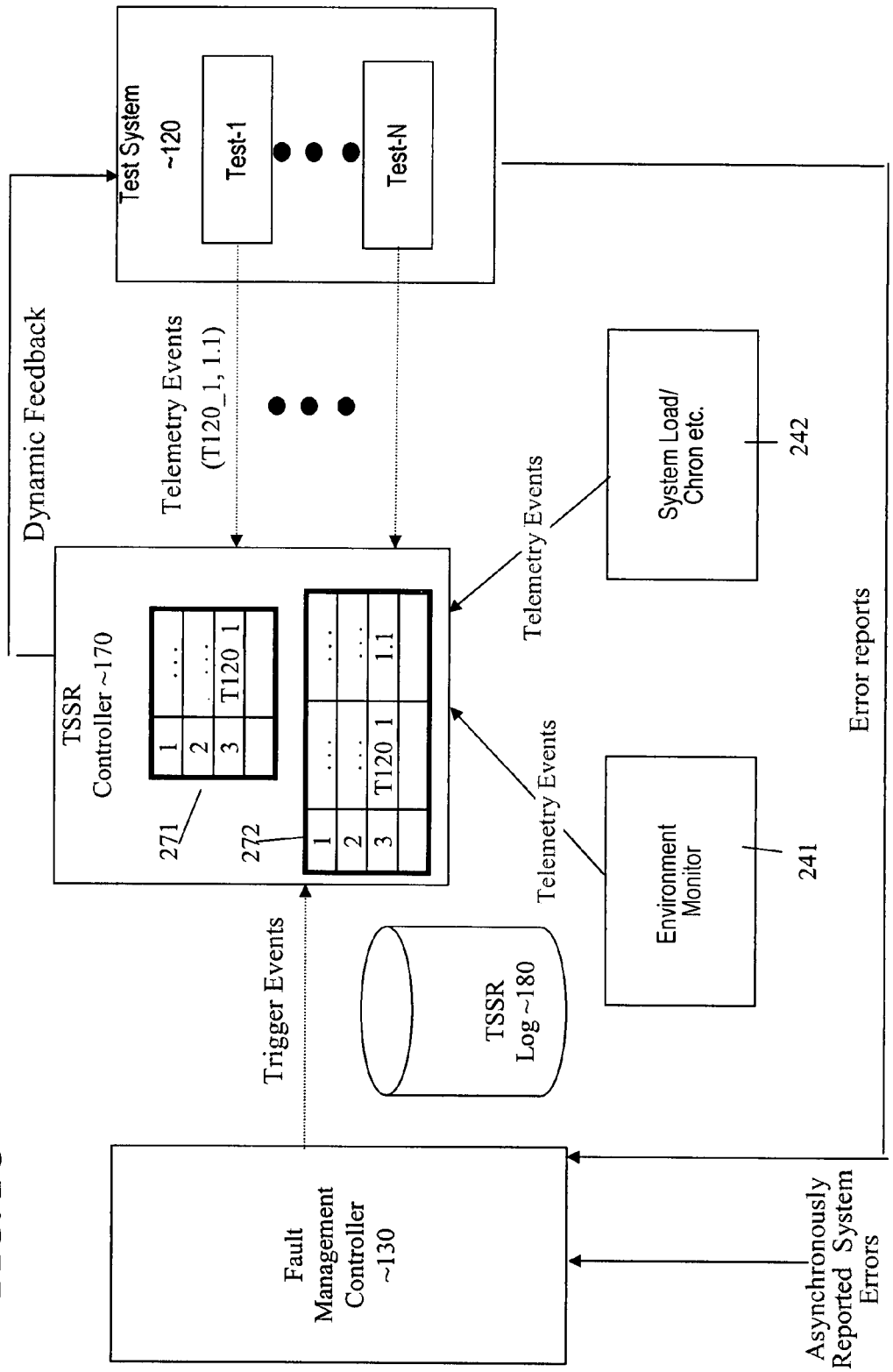

Next, test process Test-1 sends another telemetry information event (T120_1, 1.1) (FIG. 2C) to indicate that a subprocess has been started. Upon receipt of telemetry information event (T120_1, 1.1), TSSR controller 170 extracts unique identifier T120_1 for the sender—test process Test-1—and telemetry information 1.1 from the event. Since the sender associated with unique identifier T120_1 has previously sent an event, TSSR controller 170 retrieves the index from table 271. Next, TSSR controller 170 accesses the location in current telemetry event list 272 associated with the index and writes a new name-value pair, the unique identifier and the telemetry information, in list 272. Since only one entry per event sender is permitted in list 272, the old data is overwritten, in this embodiment. This concludes the processing of event (T120_1, 1.1).

Figure 2D:
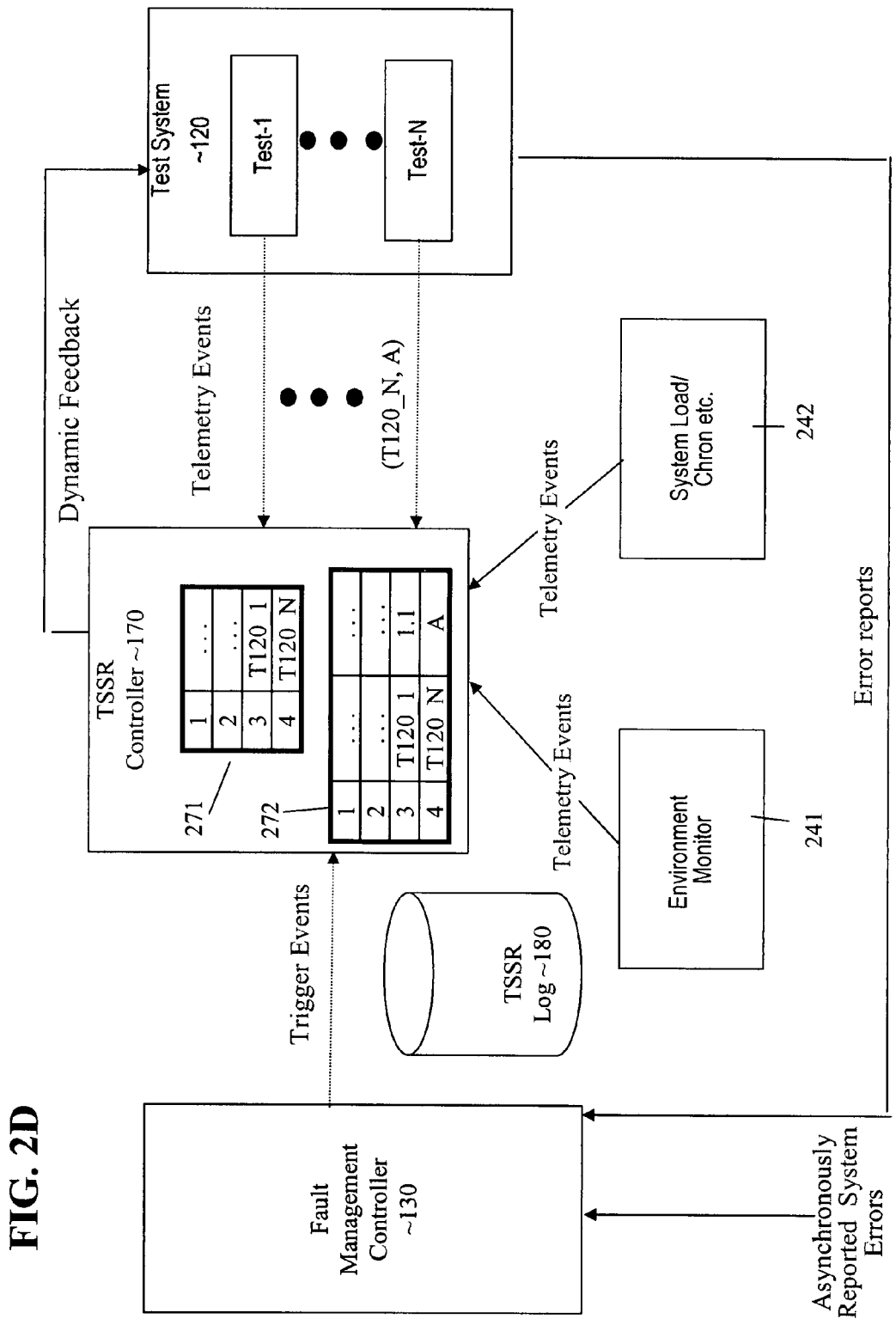

Telemetry information event (T120_N, A) (FIG. 2D) from test process Test-N is received next by TSSR controller 170. Upon receipt of the event (T120_N, A), TSSR controller 170 extracts unique identifier T120_N for the sender and telemetry information A from the event. TSSR controller 170 determines whether the sender associated with unique identifier T120_N has previously sent an event, e.g., the second column of index table 271 is searched for unique identifier T120_N. Since this is the first event from the sender, unique identifier T120_N is not found. Thus, TSSR controller 170 assigns an index 4, in this example, to the sender (See FIG. 2D). Next, TSSR controller 170 accesses the location in current telemetry event list 272 associated with the index and writes a name-value pair, the unique identifier and the telemetry, in list 272. This concludes the processing of event (T120_N, A).

Figure 2E:
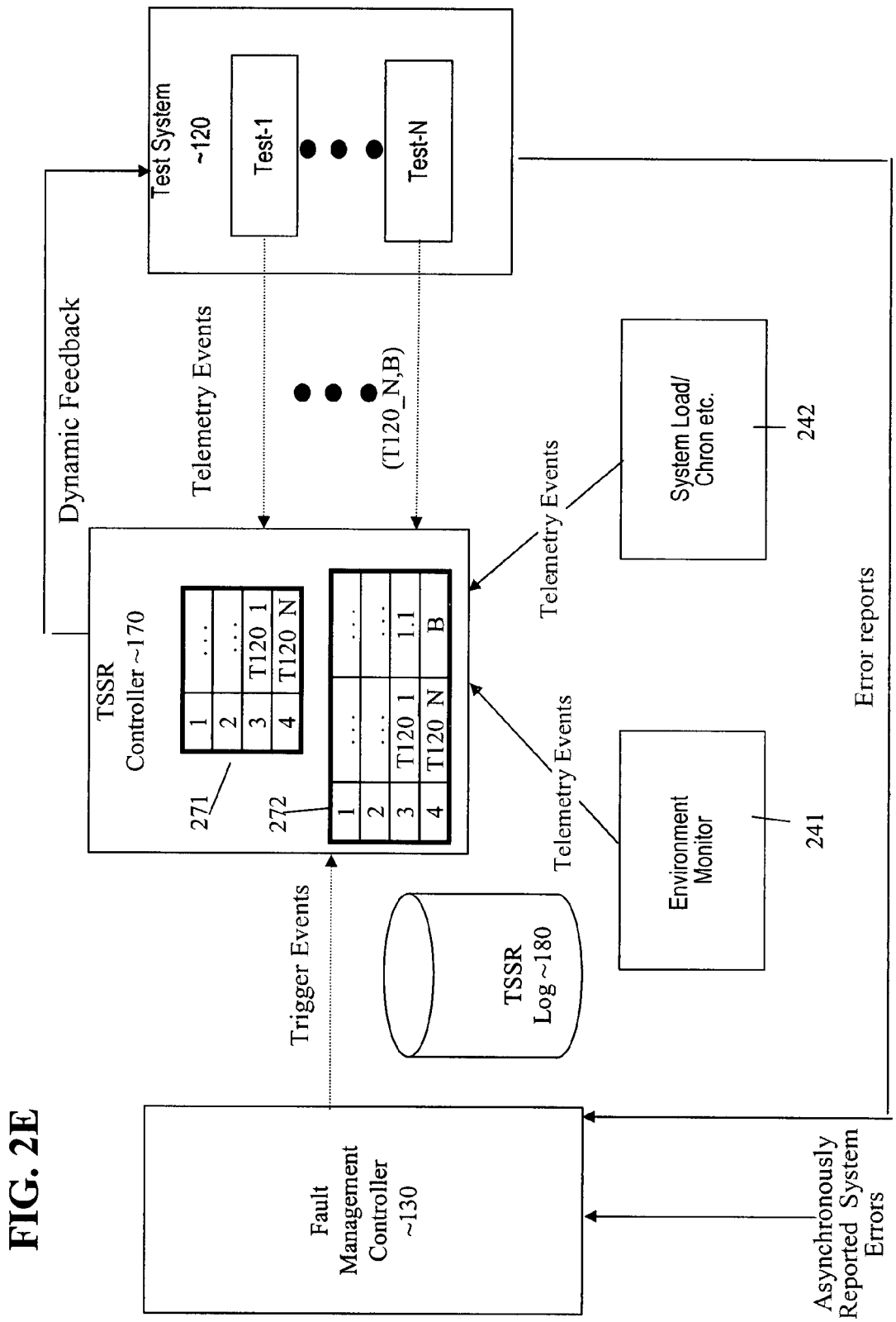

Test process Test-N sends another telemetry information event (T120_N, B) (FIG. 2E). Upon receipt of telemetry information event (T120_N, B), TSSR controller 170 extracts unique identifier T120_N for the sender—test process Test-N—and telemetry information B from the event. Since the sender associated with unique identifier T120_N has previously sent an event, TSSR controller 170 retrieves the index from table 271. TSSR controller 170 accesses the location in current telemetry event list 272 associated with the index and writes a new name-value pair, the unique identifier and the telemetry information, in list 272. This concludes the processing of event (T120_N, B).

Figure 2F:
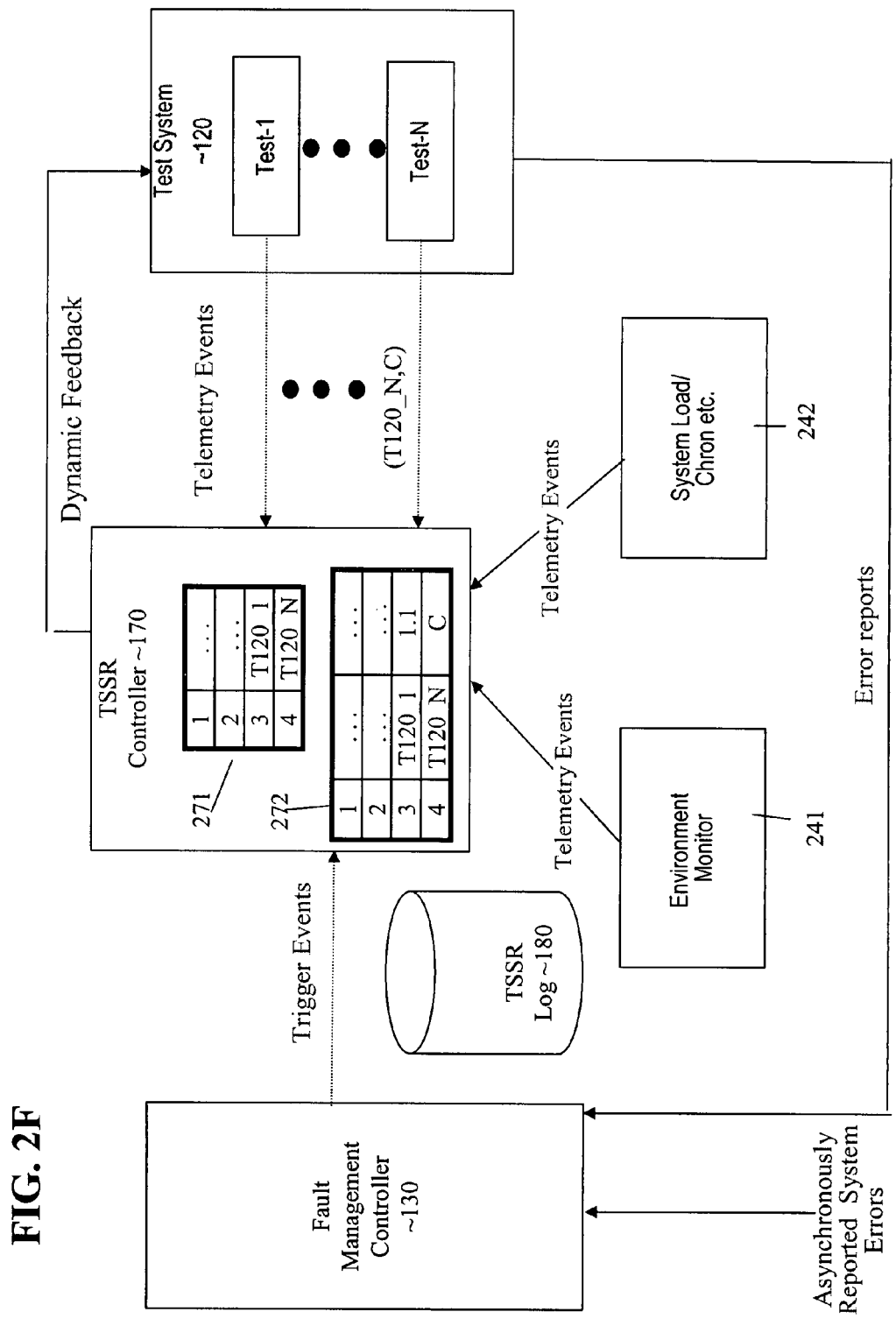
Figure 2G:
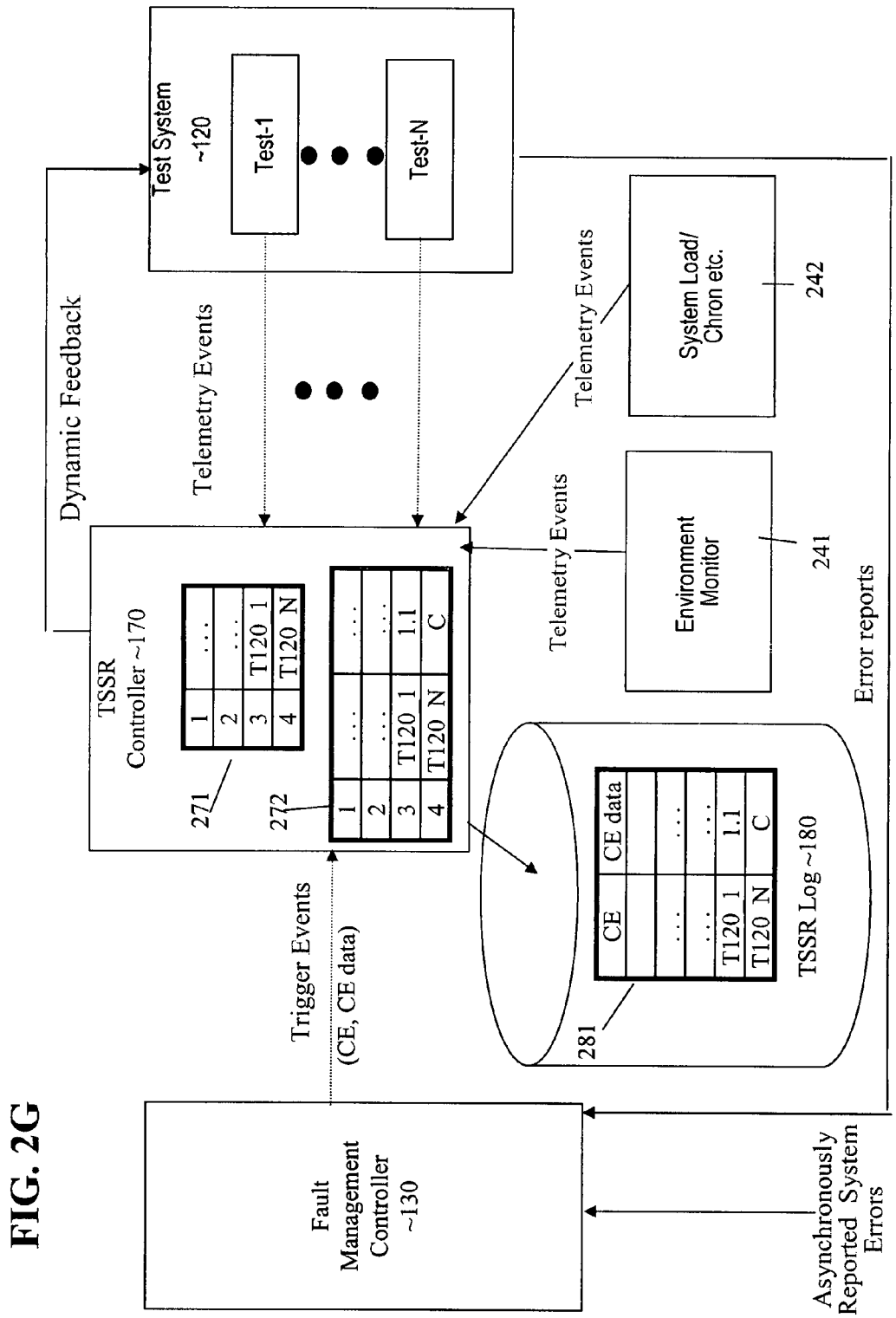

Next, test process Test-N sends yet another telemetry information event (T120_N, C) (FIG. 2F). Upon receipt of telemetry information event (T120_N, C), TSSR controller 170 extracts unique identifier T120_N for the sender—test process Test-N—and telemetry information C from the event. Since the sender associated with unique identifier T120_N has previously sent an event, TSSR controller 170 retrieves the index from table 271. Next, TSSR controller 170 accesses the location in current telemetry event list 272 associated with the index and writes a new name-value pair, the unique identifier and the telemetry information in list 272. This concludes the processing of event (T120_N, C). In this example, list 272 is an example of an internal data structure in memory of TSSR controller 170 that holds a snap-shot of the possible stimuli for an error or fault.

Fault Management controller 130 sends a trigger event (CE). Trigger event (CE) includes information to allow identification of the event type, e.g., hardware error, software error, expiration of a timer, etc., and optionally details about the triggering event, e.g., location, hardware component, etc. Upon receipt of trigger event (CE), in one embodiment, TSSR controller 170 momentarily stop updating list 272. Any new telemetry events that are received while trigger event (CE) is being processed are queued for updating list 272, i.e., the snap-shot list, after processing of trigger event (CE) is completed.

In response to trigger event (CE), TSSR controller 170 creates a log entry 281 in TSSR log 180, i.e., logs the current state (snap-shot) of the possible stimuli. Information logged includes details CEdata about trigger event (CE) along with an annotation of the snap-shot capture of possible stimuli at the time of the error. Thus, processing of reams of data in multiple logs in an attempt to identify processes and state information is no longer necessary. Log entry 281 includes sufficient information for root cause and corrective action.

In one embodiment, log entry 281 is written in the XDR format. See, for example, Network Working Group, RFC 1832—XDR: External Data Representation Standard, R. Srinivasan, Sun Microsystems, August, 1995, which is incorporated herein by reference as evidence of the knowledge of those of skill in the art. To view the log, the XDR data is rendered, for example, in either text of XML, and printed or displayed for viewing.

The snap-shot capability of TSSR controller 170 allows better test instrumentation and error correlation, e.g., ability to monitor what tests were running on test system 120 and what the tests were doing when a particular error was observed. In addition to being useful during root cause and corrective action of a hardware issue, such snap-shot capabilities also lead to better test characterization both during experimental stages as well via data mining from the computer-system manufacturing floor.

In one embodiment, in response to trigger event (CE), TSSR controller 170 provides dynamic feedback to test system 120, e.g., to repeat a particular test or to launch a new test. This feedback loop on test performance allows improvement of test effectiveness and repeatability. The dynamic feedback also facilitates informed decisions when deploying the tests on a computer-system manufacturing floor.

The dynamic feedback infrastructure can be used to implement smart testing capabilities based on feedback from TSSR controller 170. For example, tests could be implemented to automatically repeat a test sequence on error detection. This can be useful in reducing the time to failure on the computer system manufacturing floor as many times the component rejection criteria requires multiple failure occurrences.

Figure 2H:
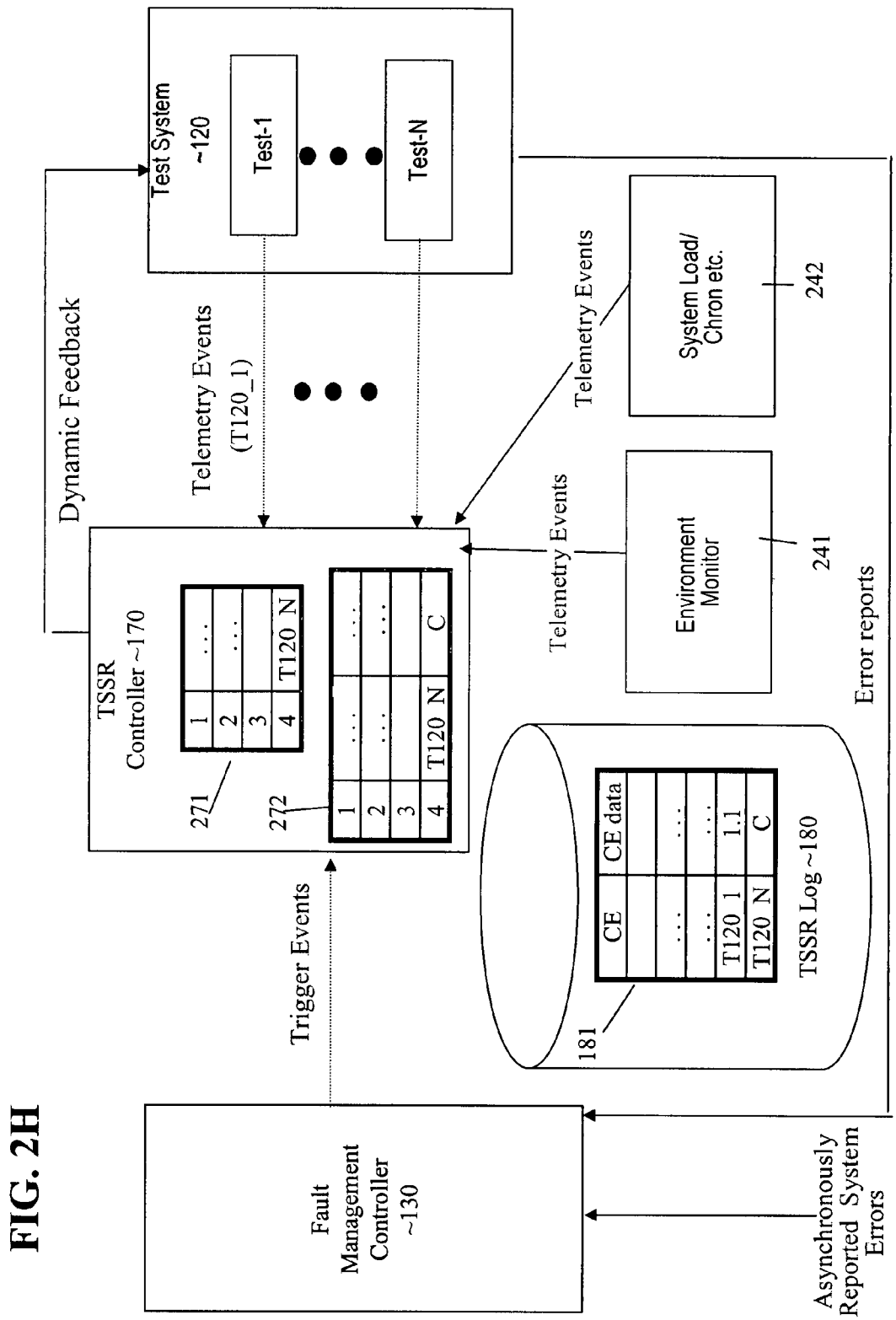

When test process Test-1 has completed, test process Test-1 issues a telemetry terminate event (T120_1) (FIG. 2H). A telemetry terminate event does not carry any telemetry information in this embodiment. In response to telemetry terminate event (T120_1), TSSR controller 170 extracts unique identifier T120_1 and determines the index associated with unique identifier T120_1. TSSR controller 170 clears the entry in the index table 271 and the entry in current telemetry event list 272 associated with that index. Telemetry event providers, the senders in the above description, are expected to issue a telemetry terminate event before exiting.

A telemetry event provider may also issue a telemetry terminate event when there is no new telemetry to provide and the telemetry event provider knows that the previously reported information is out of date. As noted a telemetry terminate event instructs TSSR controller 170 to throw away any previously reported information from that telemetry event provider.

There is a possibility that a telemetry event provider may be killed without sending a telemetry terminate event. Such a scenario can occur due to an exception encountered by the telemetry event provider or a hardware fault, e.g., a process may be killed if that process steps on a memory location that has an uncorrectable error. In such cases, the snap-shot of the state of the stimuli being maintained in TSSR controller 170 can get out of sync with the telemetry event providers actually executing. The telemetry information event last sent by the telemetry event provider that was killed would be left in snap-shot structure 272 indefinitely without any updates.

In one embodiment, TSSR controller 170 and all telemetry event providers, Test-1, . . . , Test-N, 241, 242 are managed under a Service Management Framework, such as smf(5) which is provided as a core part of the Fault Management Architecture available in the Solaris 10 operating system. As such, any failure of a particular telemetry event provider results in automatic restart of the same. Hence, no special handling is required in TSSR controller 170. Also, the expectation of a high frequency of telemetry information events suggests that any check-point mechanisms in TSSR controller 170 may be unwarranted.

Where it is not possible to have a Service Management Framework, TSSR controller 170 handles any exceptions that might occur in the telemetry event providers. In one embodiment, TSSR controller 170 implements a life time for every telemetry event, and flushes a telemetry event upon expiration of its lifetime.

In another embodiment, TSSR controller 170 extracts a process ID (PID) of the telemetry event sender from any telemetry information event (or more accurately the process that will be ultimately responsible to send the "telemetry terminate event") for that particular stimulus. The PID is maintained in a separate list that has the unique name of the telemetry event provider and the PID. This list is periodically checked by TSSR controller 170 for the presence of the PID and if a particular telemetry event provider does not exist, corresponding telemetry information is automatically removed from snap-shot 272.

In yet another embodiment, one harness process spawns all telemetry event providers and the harness has the responsibility to generate the telemetry terminate events as the child processes exit. Thus, the harness process is responsible to spawn all tests and then send the "telemetry terminate" event for each test. TSSR controller 170 knows the PID of this harness process and monitors its existence. If the harness process were to get killed, TSSR controller 170 knows that the telemetry snap-shot may be out of date from there on and self exits.

These embodiments for maintaining synchronization between stimuli information in the snap-shot list and the executing telemetry event providers are illustrative only and are not intended to limit the invention. In view of this disclosure, one of skill in the art can maintain synchronization in a particular application using any one or any combination of these or other techniques.

Figure 3:
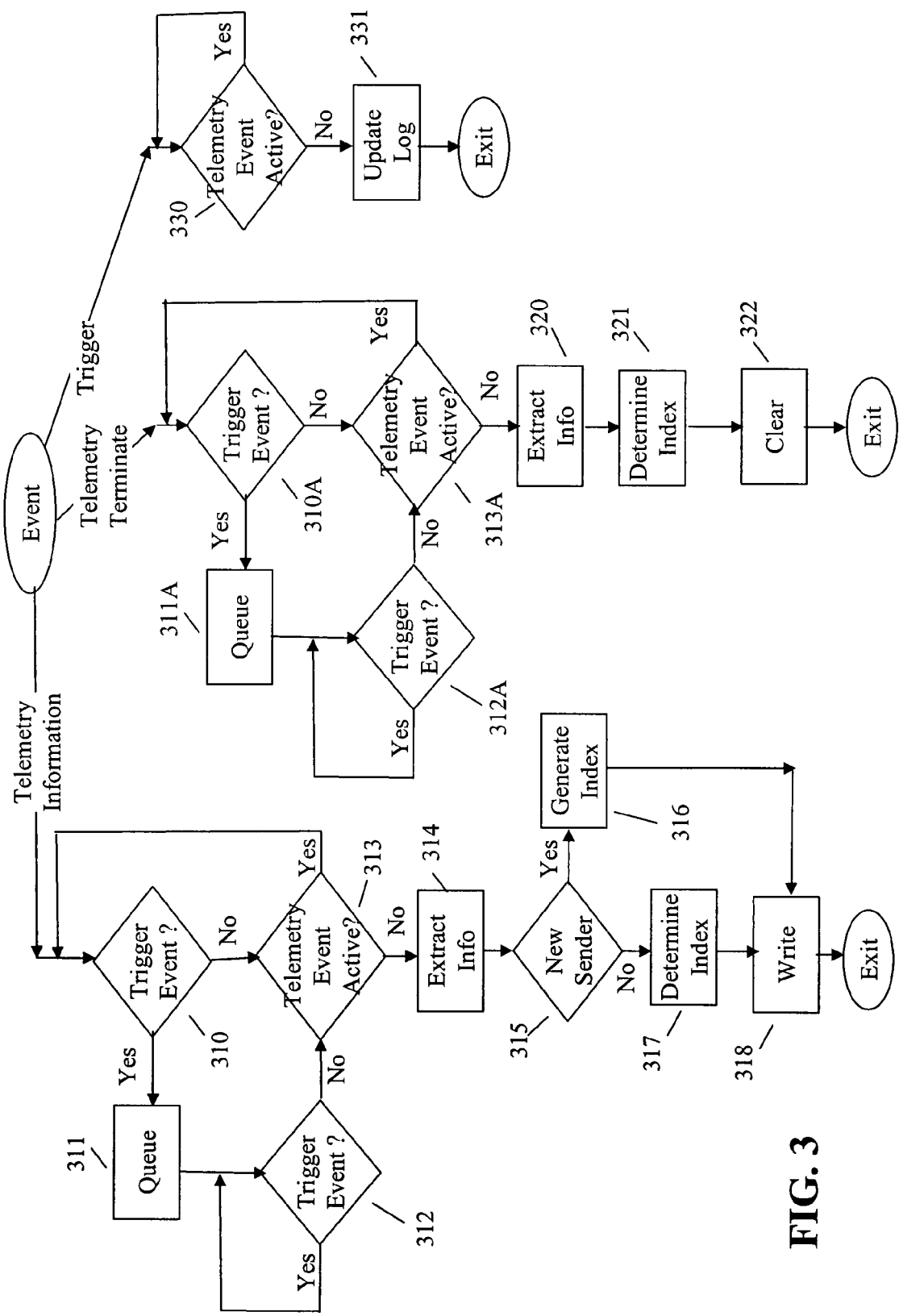
FIG. 3 is a process flow diagram for processing events by the TSSR controller according to one embodiment of this invention.

FIG. 3 is one embodiment of a process flow diagram for handling events by TSSR controller 170, as described above. In this embodiment, list 272 is implemented as a name-value list that is used to capture the latest snap-shot of the state of the telemetry event providers. At the start of TSSR controller 170, a name-value list (nvlist) is allocated and initialized to enforce unique name-value pair names in that list. When a new name-value pair is added to the name-value list, any existing name-value pair with a matching name is automatically removed before the new name-value pair is added. To provide the latest snap-shot of the status of the telemetry event providers on occurrence of an error, all telemetry information events result in adding/removing a name-value pair to/from the list, and any trigger events result in logging the contents of the name-value list.

Since there can be multiple threads (events) accessing the name-value list at the same time, synchronization was implemented in the embodiment of FIG. 3. In general, many threads can have simultaneous read-only access to data, while only one thread can have write access at any given time. However, TSSR controller 170 gives higher priority to reader threads, e.g., trigger events that result in reading the snap-shot name-value list and write the list to the log file. TSSR controller 170 allows one telemetry event at a time to update the snap-shot name-value list. In general, TSSR controller 170 enforces the rule that no writing to the snap-shot name-value is permitted if a reader thread is waiting to read or is reading the snap-shot name-value list. This allows TSSR controller 170 to log the current snap-shot name-value list in response to a trigger event without any further changes to the name-value list due to subsequent telemetry events.

TSSR controller 170 processes at least three types of events: (i) trigger events; (ii) telemetry information events; and (iii) telemetry terminate events using process 300. Telemetry events include telemetry information events and telemetry terminate events.

Upon receipt of a telemetry information event, trigger event check operation 310 determines whether a trigger event is reading the snap-shot name-value list, i.e., whether a trigger event is active, or whether a trigger event is waiting for completion of processing of a current telemetry event. If a trigger event is active or waiting, processing transfers to queue operation 311 and otherwise to telemetry event active check operation information operation 313.

Queue operation 311 queues the telemetry information event for subsequent processing when no trigger event is active or waiting. This is represented in FIG. 3 by queue operation 311 transferring to trigger event check operation 312. Processing remains in check operation 312 until there is no trigger event either active or waiting (note multiple trigger events can be executed simultaneously as separate threads) and then processing transfers to telemetry event active check operation 313. Check operation 312 is used to indicate that processing of the telemetry information event is delayed until the processing of all trigger events is completed. FIG. 3 should not be interpreted as requiring repetitive polling to determine whether any trigger event is active or waiting.

In this embodiment, if TSSR controller 170 receives a new telemetry event while a current telemetry event is being processed, the new telemetry event is held until processing of the current telemetry event is completed. Also, recall that priority is given to a trigger event that results in reading the snap-shot name-value list over a telemetry event that results in writing to the snap-shot name-value list. Thus, if a trigger event also is received while the current telemetry event is being processed, in this embodiment, the new telemetry event is queued, and the trigger event processing commences upon completion of the processing of the current telemetry event. In another embodiment, when a current telemetry event is being processed and a new telemetry event is followed by a trigger event, the new telemetry event is processed and then the trigger event is processed.

In the embodiment of FIG. 3, a trigger event is always given priority. Thus, when processing reaches telemetry event active check operation 313, a trigger event is not active, but a current telemetry event may be active. If a current telemetry event is active, check operation 313 transfers to trigger event active check operation 310 to determine whether a trigger event arrived after the new telemetry event, but before the current telemetry event completed processing. If a trigger event was received, the new telemetry event is queued in queue operation 311 and otherwise processing returns to check operation 313. Conversely, if another telemetry event is not being processed upon entry to check operation 313, check operation 313 transfers to extract information operation 314.

Extract information operation 314 extracts the telemetry information and the unique identification of the sender from the telemetry information event. In one embodiment, application programming interface (API) int sendTestInfoEvent (char* testName, int instance no, nvlist t* nvl) is used by any telemetry event provider to send a telemetry information event. In this embodiment, telemetry events are synchronous. This means that when a test process, i.e., a telemetry event provider, calls the API to send a telemetry event, the API (function) does not return until the event has been processed, thereby preventing the stimuli from changing state once a trigger event has been received In API sendTestInfoEvent, a test name parameter testName and an instance name parameter instance no are used to uniquely identify the sender of the event. In one implementation, a concatenation of the test name and instance number is used as the unique name when adding the information to snap-shot name-value list nvlist. A third parameter nvl (a name-value list) forms the value of the name-value pair to be added into snap-shot name-value list nvlist. Thus, in this embodiment, extraction operation 313 (i) creates a unique identifier using the first two parameters and uses the unique identifier as the "name" in the name-value pair stored in the snap-shot; and (ii) uses third parameter nvl as the corresponding "value". Snap-shot name-value list nvlist is therefore a name value list of name value lists, with each name value pair representing a unique telemetry provider (name) and corresponding telemetry information (parameter nvl saved as value). Extract information 314 transfers to new sender operation 315.

If this is a first telemetry information event from a sender, a new sender check operation 315 transfers to generate index operation 316 and otherwise to determine index 317. Both operations 316, 317 obtain an index to the snap-shot name-value list, as described above, and transfer to write operation 318.

In write operation 318, the telemetry information from the telemetry event is written in the snap-shot name-value list at the location addressed used the index. If there is already information in that location, the old telemetry information in the snap-shot name-value list is overwritten. This completes the processing of the telemetry information event.

Upon receipt of a telemetry terminate event by TSSR controller 170, operations 310A to 313A are performed for the telemetry terminate event. Operations 310A to 313A are equivalent to operations of 310 to 313 and so the descriptions of those operations are incorporated herein by reference with the telemetry information event replaced with the telemetry terminate event.

Extract information operation 320 extracts the unique identification of the sender from the telemetry terminate event. In one embodiment, application programming interface (API) int sendTestDoneEvent(char* testName, int instance no) is used by any telemetry event provider to indicate the end of a test. This API is registered by the test to be executed during the cleanup routine or test end in general.

In this embodiment, extract information operation 320 extracts the test name and the instance name and concatenates the two to form the unique identifier and then transfers to determine index operation 321 that in turn determines the index for the name-value list for the unique identifier. Operation 321 transfers to clear operation 322.

In clear operation 323, TSSR controller 170 simply removes any name-value pair in snap-shot name-value list nvlist that matches the name formed by concatenation of test name and instance number. This completes the processing of the telemetry terminate event.

Upon receipt of a trigger event by TSSR controller 170, TSSR controller 170 determines whether a telemetry event is currently being processed in telemetry event active check operation 330. If a telemetry event is not being processed, check operation transfers to update log operation 331. Otherwise, processing remains in telemetry event active check operation 330 until the processing of the telemetry event completes and then transfers to update log operation 331.

In update log operation 331, controller 170 adds snap-shot name-value list nvlist and a report for the trigger event in tandem to the log file.

In one embodiment; the synchronization described with respect to FIG. 3 is implemented using a special read-write lock. In general, a read-write lock allows many threads to have simultaneous read-only access to data, while only one thread can have write access at any given time. However, with this special read-write lock, TSSR controller 170 gives higher priority to the reader threads, i.e., trigger events. TSSR controller 170 grabs the write lock whenever the snap-shot name-value list is updated in response to a telemetry vent. Similarly, TSSR controller 170 grabs the read lock before logging the snap-shot list as a log entry. Use of this special read-write lock allows TSSR controller 170 to enforce the rule that no write locks are given if a reader thread is waiting on acquiring a lock. This allows TSSR controller 170 to log the current snap-shot name-value list in response to a trigger event without any further changes to the name-value list due to subsequent telemetry events.

The APIs in the above description are illustrative only and are not intended to limit the invention to this specific embodiment. FIGS. 4A to 4C are a computer program listing, written in the C++ programming language, for another embodiment of the APIs. In this embodiment, TSSR controller 170 is referred to as a TSSR agent. Test system 120 is the VTS system available from Sun Microsystems, as described above. Fault management controller 130 is the Fault. Management daemon in the Fault Management Architecture in the Solaris 10 operation system.

Figure 5:
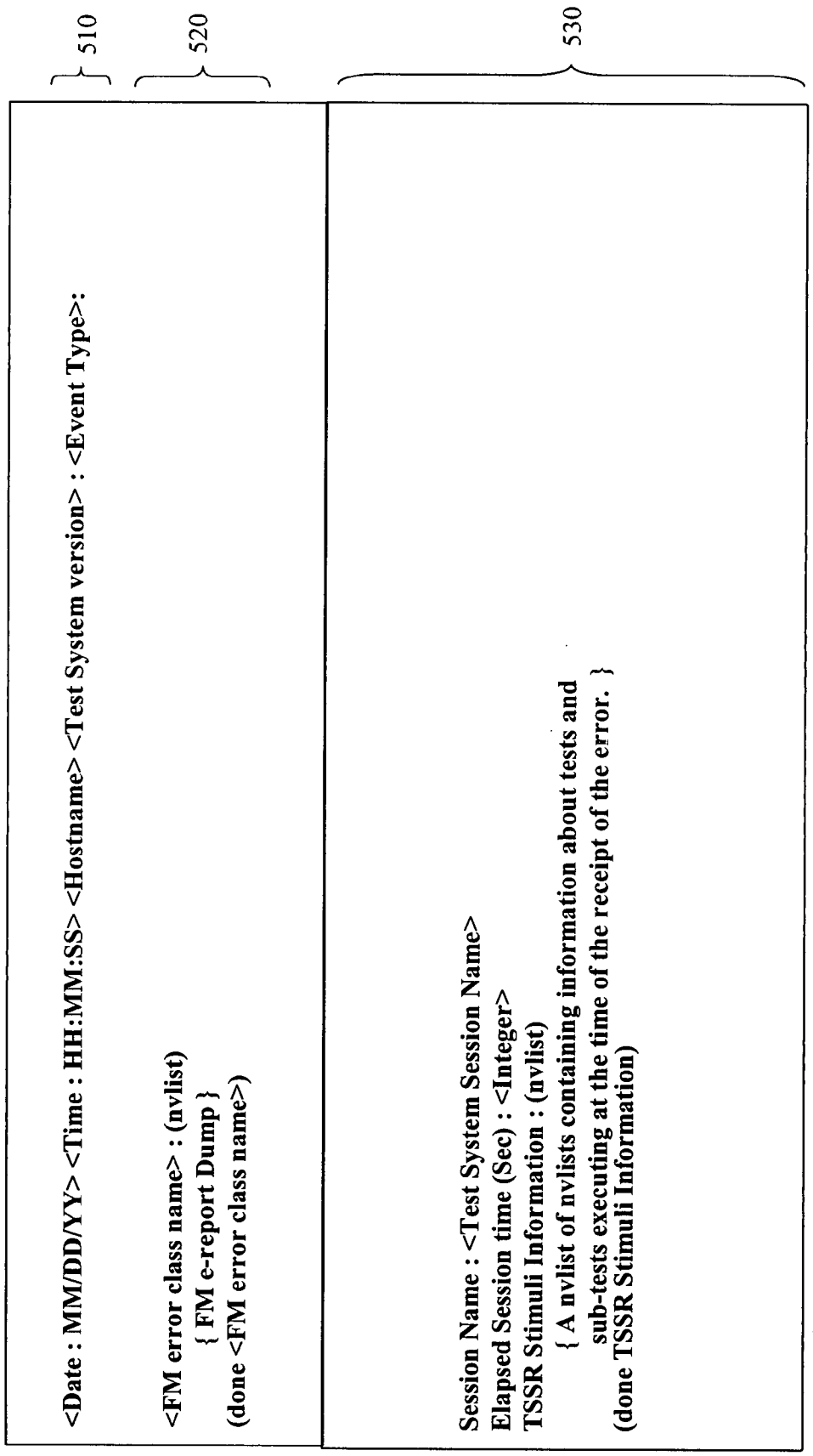
FIG. 5 is an illustration of one embodiment of a format for a log entry in the TSSR log.

FIG. 5 is an illustration of one embodiment of a format for a log entry 581. Log entry 581 includes a header 510, a trigger event report 520 and stimuli information 530. Header 510 includes a time stamp, the host name, the test system version and the event type. For the Fault Management Architecture, as described above, trigger event report 520 includes an error name and a name-value list. Stimuli information 530 includes a session name, the elapsed session time, and the snap-shot list, i.e., the name-value list.

Some sample log entries are presented below in Tables 1 to 3. In a first case, the trigger event was a correctable memory error, which occurred while running tests vmemtest and pmemtest in SunVTS™ functional mode. Both tests were executed with 6 instances each (meaning that there could be at most 6 processes spawned for each of the tests). Internally, SunVTS™ diagnostic tool manages each instance and the test instances behave differently based on instance number and total number of instances. For example, the memory locations accessed by test pmemtest would be different depending on the instance number and total number of instances.

At the time of the error, the SunVTS™ user interface showed that test vmemtest instance 0 and instance 5 were executing concurrent to test pmemtest instances 2, 4 and 5. This information is not logged by default by SunVTS™ diagnostic tool but can be of interest for root cause and corrective action on occurrence of an error. The log entry in Table 1 below shows the snap-shot of this information automatically captured by TSSR controller 170, along with the header and the error information (The date is fictitious).

TABLE 1

Jul. 19, 2007 15:39:16.942410560 ereport.cpu.ultraSPARC-IIIplus.ce
   detector cpu = Oxe
   afsr = 0x2000001ca
   afar = 0x20194b8000
   syndrome = Ox1ca
   unum = /N0/SB5/P0/B0/D2 J13500
   Stimuli Information:
pmemtest.2:
   size=0, eccmon=Disabled, threshold=2, section=−1, dev=mem
pmemtest.4:
   size=0, eccmon=Disabled, threshold=2, section=−1, dev=mem
vmemtest.5:
   mode=Regular, reserve=0, amount=0, type1=Enabled, pp1=address,
   type2=Enabled, pp2=walk_1, type3=Disabled, pp3=checkerboard,
   type4=Disabled, pp4=checkerboard, type5=Disabled, pp5=checkerboard
pmemtest.5:
   size=0, eccmon=Disabled, threshold=2, section=−1, dev=mem
vmemtest.0:
   mode=Regular, reserve=0, mount=0, type1=Enabled, pp1=address,
   type2=Enabled, pp2=walk_1, type3=Disabled, pp3=checkerboard,
   type4=Disabled, pp4=checkerboard, type5=Disabled, pp5=checkerboard Another test ramtest was modified to provide information about subtests as well. An example of the log entry is provided in TABLE 2.

TABLE 2

Jul. 19, 2007 17:00:06.402355160 ereport.cpu.ultraSPARC-IIIplus.ce
   detector cpu = Oxe
   afsr = 0x2000001ca
   afar = 0x67048000
   syndrome = Ox1ca
   unum = /N0/SB3/P2/B0/D2 J15500
   Stimuli Information:
   ramtest.0: LAMarch algorithm Once the tests had completed execution, an error event was injected to show that TSSR agent 170 correctly identified that no tests were running. This log entry is shown in TABLE 3.

TABLE 3

Jul. 19, 2007 17:11:51.432589528 ereport..dummy
   Stimuli Information:
   None

In many new systems, logical domains, where multiple images of an operating system can be running on the same piece of shared hardware, are used. In such cases, a hardware error may be stimulated by an activity in any of the logical domains. An application running in a single domain does not have the system wide view, its visibility is limited to the logical domain in which it resides. TSSR controller 170 can support logical domains by changing the event transport.

Herein, a computer program product comprises a computer readable medium configured to store or transport computer readable code for one, all, or any combination of test system 120, TSSR controller 170 and fault management controller 130 or in which computer readable code for one, all, or any combination of test system 120, TSSR controller 170 and fault management controller 130 is stored. Some examples of computer program products are CD-ROM discs, DVD discs, flash memory, ROM cards, floppy discs, magnetic tapes, computer hard drives, servers on a network and signals transmitted over a network representing computer readable program code. A tangible computer program product comprises a computer readable medium configured to store computer readable code for one, all, or any combination of test system 120, TSSR controller 170 and fault management controller 130 or in which computer readable code for one, all, or any combination of test system 120, TSSR controller 170 and fault management controller 130 is stored. Some examples of tangible computer program products are CD-ROM discs, DVD discs, flash memory, ROM cards, floppy discs, magnetic tapes, computer hard drives, and servers on a network.

In view of this disclosure, one, all, or any combination of test system 120, TSSR controller 170 and fault management controller 130 can be implemented in a wide variety of computer system configurations using an operating system and computer programming language of interest to the user. In addition, instructions for one, all, or any combination of test system 120, TSSR controller 170 and fault management controller 130 could be stored as different modules in memories of different devices. For example, instructions for one, all, or any combination of test system 120, TSSR controller 170 and fault management controller 130 could initially be stored in a server computer, and then as necessary, a module of the method could be transferred to a client device and executed on the client device.

In yet another embodiment, instructions for the method are stored in a memory of another computer system. Stored instructions for the method are transferred over a network to the unit under test.

Test system 120, TSSR controller 170 and fault management controller 130 are implemented, in one embodiment, using a computer source program. The computer program may be stored on any common data carrier like, for example, a floppy disk or a compact disc (CD), as well as on any common computer system's storage facilities like hard disks. Therefore, one embodiment of the present invention also relates to a data carrier for storing a computer source program for carrying out the inventive method. Another embodiment of the present invention also relates to a method for using a computer system for carrying out the method. Still another embodiment of the present invention relates to a computer system with a storage medium on which a computer program for carrying out the method is stored.

While test system 120, TSSR controller 170 and fault management controller 130 hereinbefore have been explained in connection with one embodiment thereof, those skilled in the art will readily recognize that modifications can be made to this embodiment without departing from the spirit and scope of the present invention.

We claim:

1. A computer-based method comprising:
   receiving telemetry events from at least one telemetry event provider, wherein each telemetry event provider provides telemetry information about a test stimulus applied to a system on which said computer-based method is executing, wherein said system includes a plurality of components under test;
   maintaining a snap-shot list of information from said telemetry events wherein said snap-shot list includes at most one entry from each telemetry provider that has sent a telemetry event; and
   logging, following receiving a trigger event associated with an error in said system, said snap-shot list as a log entry in a log file stored in a non-volatile memory,
      wherein said trigger event indicates an error in said system; and
      said log file stores a snap-shot of test stimuli applied to said system at the time of receipt of said trigger event.

2. The computer-based method of claim 1 wherein said telemetry event comprises a telemetry information event.

3. The computer-based method of claim 2 further comprising:
   queuing said telemetry information event when a trigger event is being processed, wherein said telemetry information event is removed from the queue and processed following completion of processing the trigger event.

4. The computer-based method of claim 2 further comprising:
   extracting information directly from said telemetry information event and using said information to form a unique identifier.

5. The computer-base method of claim 4 further comprising:
   removing from said snap-shot list any entry having an identifier equal to said unique identifier; and
   writing said unique identifier and telemetry information in said telemetry information event to said snap-shot list.

6. The computer-based method of claim 2 further comprising:
   writing telemetry information in said telemetry information event to said snap-shot list only when (i) a trigger event is not waiting to be processed; and (ii) a trigger event is not being processed.

7. The computer-based method of claim 1 wherein said telemetry event comprises a telemetry terminate event.

8. The computer-based method of claim 7 further comprising:
   extracting information from said telemetry information event;
   using said information to form a unique identifier; and
   deleting from said snap-shot list any entry including said unique identifier.

9. The computer-based method of claim 1 wherein said telemetry event provider comprises a test process executing as part of a test system.

10. The computer-based method of claim 1 wherein said telemetry event provider comprises a process for providing environmental information for said system.

11. A test and system recorder comprising:
    a log file stored in a non-volatile memory; and
    a unit under test comprising:
       i) a test system including at least one test process executing on said unit,
          wherein said test process generates telemetry events and at least one of said telemetry events includes telemetry information about a test stimulus applied to said unit under test;
       ii) a fault management controller, executing on said unit,
          wherein said fault management controller receives an error report describing an error in said unit and generates a trigger event in response to said error report;
       iii) a test and system state recorder(TSSR) controller, executing on said unit,
          wherein said TSSR controller:
             receives said telemetry events and said trigger event;
             maintains a snap-shot list of information from said telemetry events wherein said snap-shot list includes at most one entry from said at least one test process; and
             logs, following receiving said trigger event, said snap-shot list as a log entry in said log file stored in said non-volatile memory, wherein said log file stores a snap-shot of test stimuli applied to said unit under test at the time of receipt of said trigger event.

12. The test and system recorder of claim 11 wherein said telemetry event comprises a telemetry information event.

13. The test and system recorder of claim 12 wherein said TSSR controller queues said telemetry information event when said trigger event is being processed, wherein said telemetry information event is removed from the queue and processed following completion of processing the trigger event.

14. The test and system recorder of claim 12 wherein said TSSR controller extracts information directly from said telemetry information event and uses said information to form a unique identifier.

15. The test and system recorder of claim 14 wherein said TSSR controller:
    removes from said snap-shot list any entry having an identifier equal to said unique identifier; and
    writes said unique identifier and telemetry information in said telemetry information event to said snap-shot list.

16. The test and system recorder of claim 11 wherein said telemetry event comprises a telemetry terminate event.

17. The test and system recorder of claim 16 wherein said TSSR controller:
- extracts information directly from said telemetry information event;
- uses said information to form a unique identifier; and
- deletes from said snap-shot list any entry including said unique identifier.

18. A computer program product comprising a tangible computer readable medium having embedded therein computer program instructions wherein execution of said computer program instructions results in a method comprising:
- receiving telemetry events from at least one telemetry event provider, wherein each telemetry event provider provides telemetry information about a test stimulus applied to a system on which said method is executing, wherein said system includes a plurality of components under test;
- maintaining a snap-shot list of information from said telemetry events wherein said snap-shot list includes at most one entry from each telemetry provider that has sent a telemetry event; and
- logging, following receiving a trigger event associated with an error in said system, said snap-shot list as a log entry in a log file stored in a non-volatile memory,
  - wherein said trigger event indicates an error in said system; and
  - said log file stores a snap-shot of test stimuli applied to said system at the time of receipt of said trigger event.

* * * * *

UNITED STATES PATENT AND TRADEMARK OFFICE
CERTIFICATE OF CORRECTION

PATENT NO. : 7,757,124 B1
APPLICATION NO. : 11/879304
DATED : July 13, 2010
INVENTOR(S) : Amandeep Singh and Debashish Bose It is certified that error appears in the above-identified patent and that said Letters Patent is hereby corrected as shown below:

In Column 15, Line 57, Claim 5, replace "computer-base" with --computer-based--.

Signed and Sealed this

Fourteenth Day of September, 2010

David J. Kappos
*Director of the United States Patent and Trademark Office*